United States Patent
Peters et al.

(10) Patent No.: US 9,642,237 B2
(45) Date of Patent: May 2, 2017

(54) METHOD OF IMPROVING ELECTRODE LIFE BY SIMULTANEOUSLY CONTROLLING PLASMA GAS COMPOSITION AND GAS FLOW

(71) Applicant: Hypertherm, Inc., Hanover, NH (US)

(72) Inventors: John Peters, Canaan, NH (US); Jon W. Lindsay, Hanover, NH (US)

(73) Assignee: Hypertherm, Inc., Hanover, NH (US)

( * ) Notice: Subject to any disclaimer, the term of this patent is extended or adjusted under 35 U.S.C. 154(b) by 366 days.

(21) Appl. No.: 14/282,805

(22) Filed: May 20, 2014

(65) Prior Publication Data

US 2015/0342019 A1 Nov. 26, 2015

(51) Int. Cl.
*B23K 10/00* (2006.01)
*H05H 1/34* (2006.01)

(52) U.S. Cl.
CPC ............ *H05H 1/34* (2013.01); *B23K 10/006* (2013.01); *H05H 1/3405* (2013.01); *H05H 2001/3426* (2013.01); *H05H 2001/3468* (2013.01); *H05H 2001/3494* (2013.01)

(58) Field of Classification Search
CPC ............. H05H 1/34; H05H 2001/3426; H05H 2001/3468; H05H 1/3405; H05H 2001/3494; B23K 10/006
USPC ........ 219/121.5, 121.52, 121.51, 121.48, 75, 219/121.54, 121.55, 121.59
See application file for complete search history.

(56) References Cited

U.S. PATENT DOCUMENTS

| | | | |
|---|---|---|---|
| 5,017,752 A | 5/1991 | Severance, Jr. et al. | |
| 5,170,033 A | 12/1992 | Couch, Jr. et al. | |
| 6,232,574 B1 | 5/2001 | Oakley | |
| 6,326,583 B1 | 12/2001 | Hardwick et al. | |
| 7,375,303 B2* | 5/2008 | Twarog | H05H 1/34 219/121.48 |
| 8,088,248 B2* | 1/2012 | Larson | C23C 16/45561 118/715 |
| 8,541,710 B2* | 9/2013 | Brandt | H05H 1/34 219/121.39 |
| 9,427,820 B2* | 8/2016 | Mather | H05H 1/32 |
| 2005/0045600 A1 | 3/2005 | Tatham | |
| 2006/0163216 A1 | 7/2006 | Brandt et al. | |
| 2009/0240368 A1 | 9/2009 | Young, Jr. et al. | |
| 2014/0061170 A1* | 3/2014 | Lindsay | B23K 26/60 219/121.54 |

(Continued)

FOREIGN PATENT DOCUMENTS

WO 9116166 A1 10/1991

*Primary Examiner* — Mark Paschall
(74) *Attorney, Agent, or Firm* — Proskauer Rose LLP

(57) ABSTRACT

A method of operating a plasma arc torch system is provided. A first plasma gas supply source, a second plasma gas supply source, and a control unit are provided. A first plasma gas composition is flowed through a first plasma gas flow path, and a plasma arc is generated using the first plasma gas composition. After arc generation, the plasma gas composition is changed to a second plasma gas composition, and the plasma gas flow path is changed to a second plasma gas flow path, wherein the second plasma gas flow path is different from the first plasma gas flow path. The plasma arc is sustained using the second plasma gas composition. The first and second plasma gas flow paths are both at least partially disposed within the plasma arc torch.

22 Claims, 6 Drawing Sheets

(56) References Cited

U.S. PATENT DOCUMENTS

2015/0090700 A1* 4/2015 Wittmann ................ H05H 1/34
219/121.52

* cited by examiner

METHOD OF IMPROVING ELECTRODE LIFE BY SIMULTANEOUSLY CONTROLLING PLASMA GAS COMPOSITION AND GAS FLOW

FIELD OF THE INVENTION

The invention relates generally to the field of plasma arc cutting systems and processes. More specifically, the invention relates to methods and apparatuses for improving electrode life of a plasma cutter by simultaneously controlling the gas composition and the gas flow pattern around the electrode.

BACKGROUND

Plasma arc torches are widely used in the cutting and marking of materials. A plasma torch generally includes an electrode and a nozzle having a central exit orifice mounted within a torch body, electrical connections, passages for cooling, and passages for arc control fluids (e.g., plasma gas). The torch produces a plasma arc, a constricted ionized jet of a gas with high temperature and high momentum. Gases used in the torch can be non-reactive (e.g., argon or nitrogen) or reactive (e.g., oxygen or air). During operation, a pilot arc is first generated between the electrode (cathode) and the nozzle (anode). Generation of the pilot arc can be by means of a high frequency, high voltage signal coupled to a DC power supply and the torch or by means of any of a variety of contact starting methods.

In plasma cutting systems, the gas flow needed for plasma cutting can be different from the gas flow that is needed for arc ignition. At ignition the gas swirl strength may need to be increased or decreased to provide a stable arc with low erosion, but during cutting the optimum flow rate and swirl strength are often different. Known plasma cutting systems do not permit both the gas chemistry and the gas flow pattern to be optimized independently of each other between and/or during arc ignition, cutting and arc extinction. Optimizing one parameter often requires compromising with respect to another and can cause electrode life to decrease as a result.

SUMMARY OF THE INVENTION

The present invention addresses the unmet need for a plasma arc cutting system that enables both the gas flow chemistry and gas flow pattern to be optimized independently of one another during and between the stages of arc ignition, cutting and arc extinction. Specifically, the present invention relates to systems and methods for establishing in a plasma arc cutting system optimal gas flow chemistries (e.g. gas composition) and gas flow patterns (e.g. swirl patterns around the electrode) independently of one another, e.g. able to vary depending on the stage of a cutting operation (e.g. arc ignition, cutting, arc extinction). The present invention optimizes consumable life and achieves maximum cut performance without sacrificing optimum flow pattern for the sake of optimum gas chemistry, or vice versa.

In one aspect, the invention features a method of operating a plasma arc torch system. The method includes providing a plasma arc torch having a plasma chamber in which a plasma arc is generated. The method includes providing a first plasma gas supply source and a second plasma gas supply source for providing a plasma gas flow to the plasma arc torch. The method includes providing a control unit for controlling cutting parameters including plasma gas composition and plasma gas flow path. The method includes flowing a first plasma gas composition through a first plasma gas flow path. The method includes generating the plasma arc using the first plasma gas composition. The method includes changing the first plasma gas composition to a second plasma gas composition after the plasma arc is generated. The method includes changing the first plasma gas flow path to a second plasma gas flow path after the plasma arc is generated, the second plasma gas flow path different from the first plasma gas flow path. The method includes sustaining the plasma arc using the second plasma gas composition. The first and second plasma gas flow paths both are at least partially disposed within the plasma arc torch.

In some embodiments, the method includes cutting a workpiece with the plasma arc torch after changing the first plasma gas composition to the second plasma gas composition and after changing the first plasma gas flow path to the second plasma gas flow path. In some embodiments, the method includes adjusting, in response to receiving a stop signal, at least one of a supply current, a gas flow pressure, a gas composition, or a gas flow path. In some embodiments, the method includes detecting an arc transfer after the plasma arc is generated. In some embodiments, the method includes at least one of (i) changing the second plasma gas composition to a third plasma gas composition; and/or (ii) changing the second plasma gas flow path to a third plasma gas flow path.

In some embodiments, the third plasma gas flow path includes a portion of the first plasma gas flow path and/or a portion of the second plasma gas flow path. In some embodiments, changing the second plasma gas composition and/or the second plasma gas flow path is performed in response to (i) a removal of a start signal from the plasma torch system; and/or (ii) a time offset from a transfer sense. In some embodiments, changing the second plasma gas composition or the second plasma gas flow path includes decreasing a gas pressure of the plasma gas. In some embodiments, the method includes adjusting a current value of the plasma arc.

In some embodiments, the first plasma gas flow path is configured to impart a substantially radial velocity component to the plasma gas. In some embodiments, the second plasma gas flow path is configured to impart a substantially axial velocity component to the plasma gas. In some embodiments, the first plasma gas composition includes at least one of oxygen, nitrogen, air, or argon. In some embodiments, the second plasma gas composition includes an oxidizing gas or consists essentially of oxygen. In some embodiments, changing the first plasma gas flow path to a second plasma gas flow path includes changing at least one of a plasma gas pressure or a plasma gas flow rate. In some embodiments, the first plasma gas flow path and the second plasma gas flow path are configured to impart different and distinct velocity components or swirl patterns to the plasma gas flow through the plasma arc torch. In some embodiments, the third plasma gas flow path is configured to impart a third swirl pattern to the plasma gas flow.

In another aspect, the invention features a method for operating a plasma torch system. The method includes providing a plasma torch having a nozzle and an electrode. The nozzle and the electrode define a plasma chamber in which a plasma arc is generated. The method includes providing a plasma gas supply source for providing a plasma gas flow to the plasma torch. The method includes providing a control unit for controlling cutting parameters including a plasma gas composition and a plasma gas flow path to the plasma torch. The method includes generating the plasma arc. The method includes establishing a first plasma gas composition and a first plasma gas flow path. The first plasma gas flow path is configured to impart a first swirl pattern to the plasma gas flow. The method includes changing the first plasma gas composition to a second plasma gas composition. The method includes changing the first plasma gas flow path to a second plasma gas flow path. The second plasma gas flow path is configured to impart a second swirl pattern to the plasma gas flow. The method includes changing the second plasma gas composition to a third plasma gas composition. The method includes changing the second plasma gas flow path to a third plasma gas flow path. The third plasma gas flow path is configured to impart a third swirl pattern on the plasma gas flow.

In some embodiments, the first gas composition and the third gas composition are substantially similar. In some embodiments, the third plasma gas flow path and the first plasma gas flow path are substantially similar. In some embodiments, the first swirl pattern is distinct from at least one of the second swirl pattern or the third swirl pattern. In some embodiments, changing the first plasma gas flow path includes changing a flow rate of plasma gas to the plasma arc torch. In some embodiments, changing the second plasma gas flow path includes changing a flow rate of plasma gas to the plasma arc torch.

In another aspect, the invention features a component for a plasma arc torch system. The component includes a non-transitory computer readable product tangibly embodied in an information carrier for use in a plasma torch system. The computer readable product is configured to cause a computer to execute a process for cutting a workpiece. The process includes generating a plasma arc using a first plasma gas composition and a first plasma gas flow path. The process includes changing the first plasma gas composition to a second plasma gas composition after the plasma arc is generated. The process includes changing the first plasma gas flow path to a second plasma gas flow path after the plasma arc is generated.

In some embodiments, the process further includes cutting a workpiece with the plasma arc torch after changing the first plasma gas composition to the second plasma gas composition and the first plasma gas flow path to the second plasma gas flow path. In some embodiments, the process further includes adjusting, in response to receiving a stop signal, at least one of a supply current, a gas flow pressure, a gas composition, or a gas flow path. In some embodiments, the process includes detecting an arc transfer after the plasma arc is generated. In some embodiments, the process further includes at least one of (i) changing the second plasma gas composition to a third plasma gas composition; or (ii) changing the second plasma gas flow path to a third plasma gas flow path. In some embodiments, the third plasma gas flow path includes a portion of the first plasma gas flow path and/or a portion of the second plasma gas flow path.

In another aspect, the invention features a plasma arc torch system. The plasma arc torch system includes a plasma arc torch body including a nozzle and an electrode. The nozzle and the electrode define a plasma chamber for generating a plasma arc. A first plasma gas flow path is at least partially disposed within the plasma arc torch body. The first plasma gas flow path is configured to independently support a first flow pattern of plasma gas to the plasma chamber. The first flow pattern is at least substantially directed radially inward. A second plasma gas flow path is at least partially disposed within the plasma arc torch body. The second plasma gas flow path is configured to independently support a second flow pattern of plasma gas to the plasma chamber. The second flow pattern is at least substantially directed axially into a plasma chamber. The second plasma gas flow path is different from and/or independent of the first plasma gas flow path.

A first plasma gas supply source is connectable to the first plasma gas flow path. A second plasma gas supply source is connectable to the second plasma gas flow path. A control unit is configured to change the first plasma gas supply source to a second plasma gas supply source having a second plasma gas composition. The control unit is configured to direct the second plasma gas composition through the second plasma gas flow path imparting the second plasma gas flow pattern on the second plasma gas during a cutting operation. The control unit is configured to change to the second plasma gas supply source and the second plasma gas flow path after an ignition of the plasma arc and/or before an extinction of the plasma arc.

In some embodiments, a set of valves is disposed between the plasma torch tip configuration and the first and second plasma gas supply sources. In some embodiments, the set of valves includes a first valve configured to direct plasma gas flow to the first plasma gas flow path, a second valve configured to direct plasma gas flow to the second plasma gas flow path, and a third valve configured to direct plasma gas flow to the first plasma gas flow path and/or the second plasma gas flow path. In some embodiments, the set of valves includes a first valve configured to direct plasma gas flow to the first plasma gas flow path and a third valve, a second valve configured to direct plasma gas flow to the second plasma gas flow path and the third valve. In some embodiments, the third valve is configured to direct plasma gas flow to both the first plasma gas flow path and the second plasma gas flow path simultaneously.

In some embodiments, the plasma arc torch system includes a non-transitory computer readable product tangibly embodied in the control unit. In some embodiments, the computer readable product includes cutting information including instructions to change a first plasma gas composition to a second plasma gas composition and to flow plasma gas through a second plasma gas flow path following plasma arc generation.

In some embodiments, the first swirl pattern is substantially directed radially inward. In some embodiments, the second swirl pattern is substantially directed axially into a plasma chamber. In some embodiments, the plasma arc torch system further includes a third plasma gas supply source. In some embodiments, the third plasma gas supply source is distinct from the first and second plasma gas supply sources.

In some embodiments, each distinct supply source includes a plurality of gases. In some embodiments, the plasma gas supply sources include at least one of oxygen, nitrogen, air, and argon. In some embodiments, the control unit is further configured to detect an arc transfer following generation of the plasma arc. In some embodiments, the control unit is further configured to change at least one of (i) the plasma gas composition, and/or (ii) the plasma gas flow path. In some embodiments, a third plasma gas flow path includes portions of both the first plasma gas flow path and the second plasma gas flow path. In some embodiments, changing the second plasma gas composition or the second plasma gas flow path is performed in response to (i) removal of an arc signal from the plasma torch system, and/or (ii) a time offset from a transfer sense.

BRIEF DESCRIPTION OF THE DRAWINGS

The foregoing discussion will be understood more readily from the following detailed description of the invention when taken in conjunction with the accompanying drawings. In the following description, it is understood that a "flow path" can be a path internal to the torch body. It is also understood that an "arc on" signal can be equivalent to a "start signal."

DETAILED DESCRIPTION OF THE DRAWINGS

Figure 1:
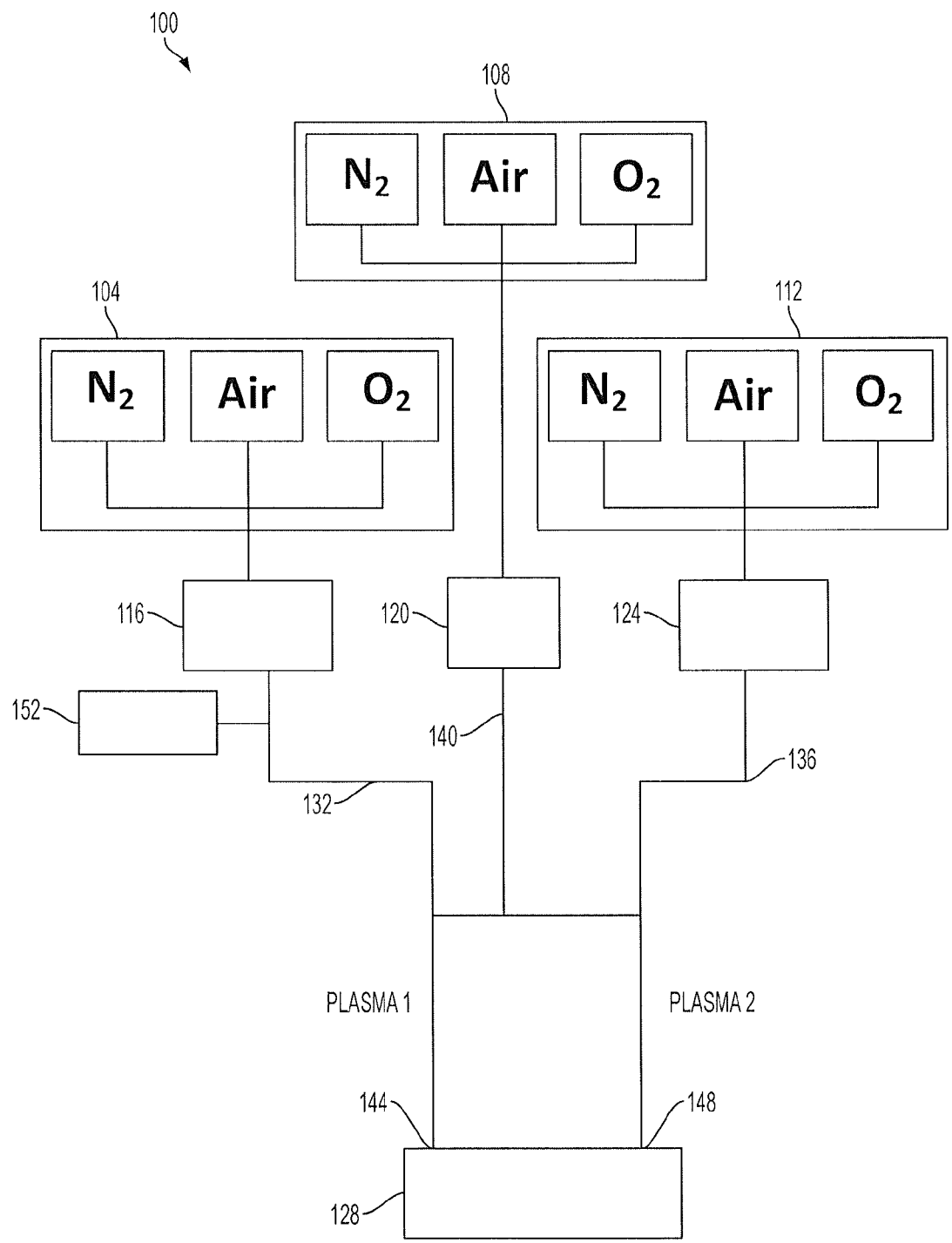
FIG. 1 is a schematic diagram of a gas flow system for a plasma arc cutting system, according to an illustrative embodiment of the invention.

FIG. 1 is a schematic diagram of a plasma gas flow system 100 for a plasma arc cutting system, according to an illustrative embodiment of the invention. The plasma gas flow system 100 includes gas supply sources 104, 108, 112 and control valves 116, 120 and 124. Gas can flow in the plasma gas flow system 100 from the gas supply source 104 to the control valve 116; from the gas supply source 108 to the control valve 120; and/or from the gas supply source 112 to the control valve 124. Gas can flow to a plasma torch 128 via an entry point 144 on the plasma torch 128. Gas can flow separately to the plasma torch 128 via an entry point 148 on the plasma torch 128. Gas can flow into the entry points 144, 148 either individually or simultaneously. For example, gas can flow from the control valve 116 through the entry point 144 via a first gas line 132. Alternatively or in addition, gas can flow from the control valve 124 through the entry point 148 via a second gas line 136. Alternatively or in addition, gas can flow from the control valve 120 through both of the entry points 144, 148 via a third gas line 140. The third gas line 140 can merge with the first gas line 132 and/or the second gas line 136 such that gas can be delivered to the torch 128 via entry points 144, 148 simultaneously or near simultaneously.

In some embodiments, the gas supply sources 104, 108, 112 each include a plurality of gases. In some embodiments, the gas supply sources 104, 108, 112 each contain separate containers for different gases (e.g. nitrogen, oxygen, air, as shown in FIG. 1). In some embodiments, the gas supply sources 104, 108, 112 include other gases alternatively or in addition, e.g. argon. Gas supplied to the plasma torch 128 via the gas lines 132, 136, 140 can include any combination of gases supplied by the gas supply sources 104, 108, 112.

In some embodiments, the plasma gas flow system 100 allows the gas delivered to the plasma torch 128 to be selected upstream of the control valves 116, 120, 124. In some embodiments, the plasma gas flow system 100 can select and/or adjust gas composition delivered to the plasma torch 128 via control of gas supply sources 104, 108, 112, and/or control valves 116, 120 and 124. Gas composition can be adjusted throughout a cut process based on the current cut process stage (e.g., pre-flow, arc ignition, cutting, arc extinction, etc.), with plasma gas flow system 100 manipulating which gas supply sources 104, 108, 112, are fluidly connected to plasma torch 128 via the selected gas flow path(s).

In some embodiments, the control valves 116, 120, 124 are pressure-controlled proportional valves, e.g. mass flow controllers. In some embodiments, the gas line 132 includes a vent valve 152. The vent valve 152 can be used to drain gas from the plasma line 132 when the arc is extinguished. When the arc is extinguished life can be increased by having low gas flow through the plasma torch 128. The vent valve 152 can enable gas that would normally need to flow out the front of the plasma torch 128 to flow out of the back of the plasma torch 128, thus improving electrode life. In some embodiments, a vent valve is placed in the plasma line 136 instead of, or in addition to, the plasma line 132.

Figure 2A:
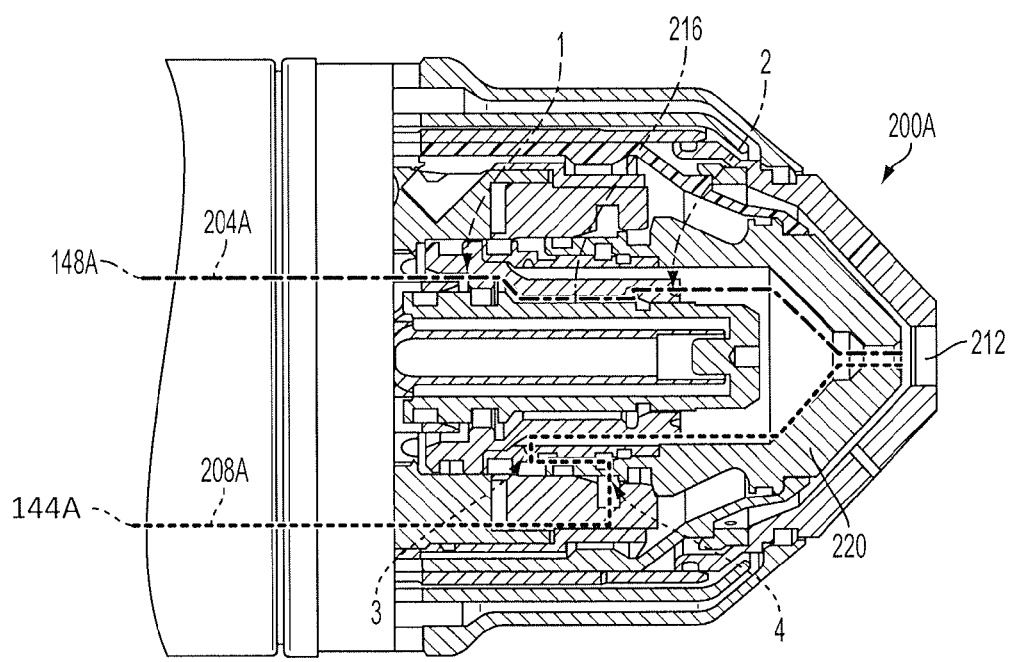
FIGS. 2A-2D are cross-sectional illustrations of a plasma arc torch showing several configurations of gas flow paths and consumable geometries within the plasma arc torch, according to an illustrative embodiment of the invention.

FIGS. 2A-2D are cross-sectional illustrations of a plasma arc torch (e.g. the plasma arc torch 128 as shown above in FIG. 1) showing several configurations of gas flow paths and consumable geometries within the plasma arc torch, according to an illustrative embodiment of the invention. FIG. 2A shows a plasma torch 200A having an electrode 216, a nozzle 220, and internal flow paths 204A, 208A. Gas can enter the internal flow path 204A via an entry point 148A (e.g. the entry point 148 as shown above in FIG. 1). Gas can enter the internal flow path 208A via an entry point 144A (e.g. the entry point 144 as shown above in FIG. 1). Gas can travel through the internal flow paths 204A, 208A and exit the plasma torch 200 at a nozzle orifice 212.

Inside the plasma torch 200A, gas entering through the entry point 148A and traveling through the internal flow path 204A passes through a set of flow metering holes labeled "1." The set of flow metering holes 1 can include six holes. In some embodiments, each of the holes can be spaced equally around a longitudinal axis of the torch. In some embodiments, each hole in the set of flow metering holes 1 can have a diameter of approximately 0.018 inches. The gas then travels along the electrode 216 and passes through a set of swirl holes labeled "2." The set of swirl holes 2 can be configured to generate a swirl pattern of the plasma gas. The set of swirl holes 2 can include twelve holes. In some embodiments, each of the holes in the set of swirl holes 2 can have a diameter of approximately 0.0225 inches. In some embodiments, each of the holes in the set of swirl holes 2 can be angled at about 20 degrees relative to a radial direction of the plasma torch 200A to generate a swirling effect. In some embodiments, a combined flow area of the metering holes 1 is less than the combined flow area of the holes in set of swirl holes 2. In some embodiments, the spacing between holes in the sets of holes 1 and/or 2 is equal (e.g. radially) to encourage uniform flow throughout the torch. In some embodiments, the sets of holes 1, 2 can each include between six and twelve holes. In some embodiments, the holes can be angled between about 10 degrees to about 30 degrees relative to a radial direction. In some embodiments, a greater angle contributes to a greater swirl strength. In some embodiments, a lower total flow area contributes to a higher velocity and/or swirl strength for a given gas flow.

Gas entering through the entry point 144A and traveling through the internal flow path 208A passes through a set of flow metering holes in the nozzle 220 labeled "4." The set of flow metering holes 4 in the nozzle 220 can include six holes. The holes can be equally spaced around a longitudinal axis of the plasma torch 200A. Each hole in the set of flow metering holes 4 can have a diameter of approximately 0.018 inches. In some embodiments, the total flow area is a significant factor. In some embodiments, the flow area of the metering holes can be less than the flow area of a downstream hole pattern. In some embodiments, the spacing between holes should be equal (e.g. radially) to encourage uniform flow through torch. The gas then travels within the plasma torch 200A and passes through a set of holes labeled "3." The set of holes 3 can be swirl-generating holes. The set of holes 3 can include twelve holes. Each of the holes in the set of holes 3 can have a diameter of approximately 0.043 inches. Each of the holes in the set of holes 3 can be directed radially inward toward the electrode 216. The set of holes 3 can be provided with an offset to impart a swirl component to the gas velocity. The set of holes 3 and/or 4 can be a separate piece permanently assembled to the rest of the nozzle using an interference fit. An interference fit can be used so that these holes are added in a separate piece but the user would receive a single-piece nozzle. Interference can be the minimum needed to keep the pieces tighter throughout the life of the nozzle. Either set of holes 3 or 4 can be added to the base nozzle piece (e.g. the same piece that has the plasma through hole). In the FIG. 2A embodiment, hole set 3 is in a separate piece and hole set 4 is in the base piece.

Figure 2B:
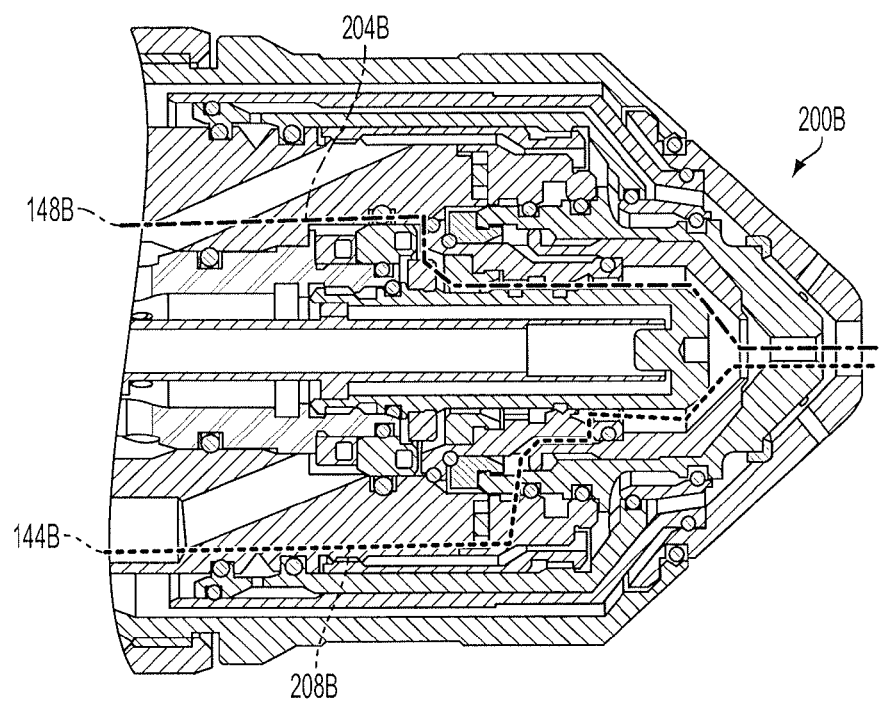
Figure 2C:
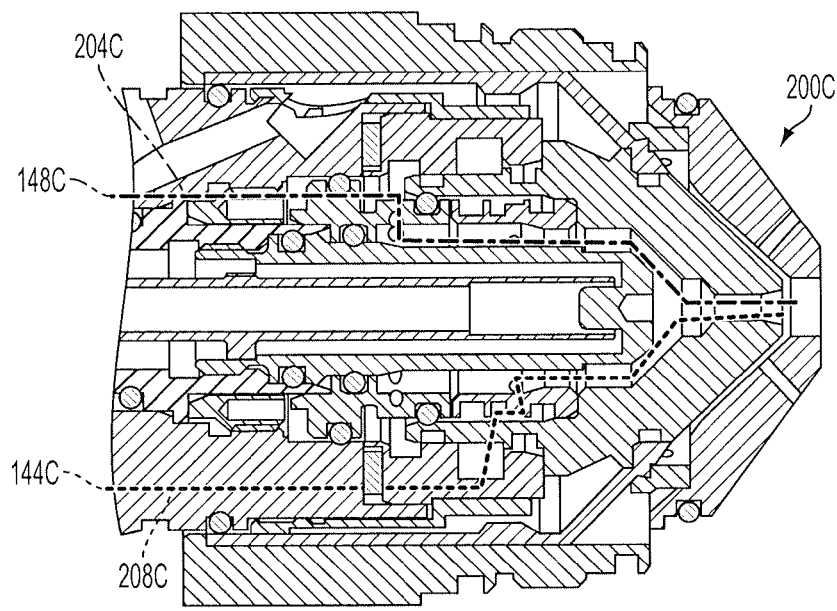
Figure 2D:
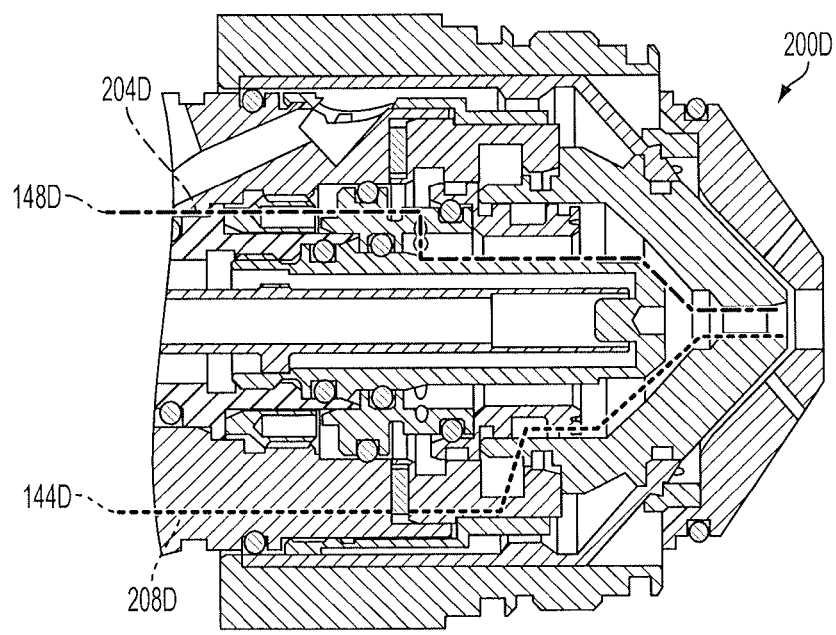

FIGS. 2B-2D show alternate configurations of the internal torch geometry of the plasma arc torch (e.g. plasma arc torches 200B-200D, or plasma arc torch 100 as shown above in FIG. 1). Each of these configurations includes two flow paths 204B-D, 208B-D internal to the torch (e.g. the FIG. 2B configuration includes flow paths 204B, 208B; the FIG. 2C configuration includes flow paths 204C, 208C, etc.). Gas travels through unique swirl generation paths having geometries that vary between FIGS. 2B-2D. For FIG. 2B both swirl flows are generated using geometry located on the swirl ring component itself. This design also shows the dual plasma flow concept in use with the vented nozzle technology. For FIG. 2C both of the flow paths have a significant radial portion of flow through both swirl holes. For FIG. 2D, the axially directed swirl is located radially outward from the other swirl gas flow. In FIG. 2D, the flow arrangement can be opposite to that shown in FIG. 2A, in which the axially directed swirl is radially inward from the other swirl flow.

In some embodiments the relative swirl strengths can be different between swirl generators. An estimate of swirl strength can be provided by taking an area ratio of the swirl generation holes. For example, in FIG. 2A, such a ratio could be defined as 12*0.0225 inch diameter to 12*0.043 inch diameter, or about 0.52. An estimate of relative swirl strength can be calculated by taking a ratio of the product of the flow area and the swirl offset. For example, in FIG. 2C this ratio would be the ratio of the product of the number of holes*the hole area*the offset of the holes. When comparing a swirl hole pattern that uses an offset to a swirl hole pattern that uses angled holes, the ratio will be the product of the flow area and a factor characterizing the tangential velocity component. For the axially directed swirl holes, this factor can be the sine of the swirl angle. For a radially directed swirl hole with an offset, this factor can be approximated by the offset. In some embodiments, one relatively weak swirl flow path and one relatively strong swirl flow path are provided. Generally, strong swirls are advantageous for cutting material. A strong swirl increases arc constriction, e.g. provides higher energy densities, protects the nozzle from damage from the arc, and helps stabilize the arc during operation. This same strong swirl can be detrimental during arc ignition, when the arc current is substantially below the steady state current. In this case, the strong swirl could be destabilizing for the arc, and the rapid arc motion could increase electrode wear. In some embodiments, the desired ratio of swirl strengths depends on the geometry of the torch parts and the operating current.

Figure 3:
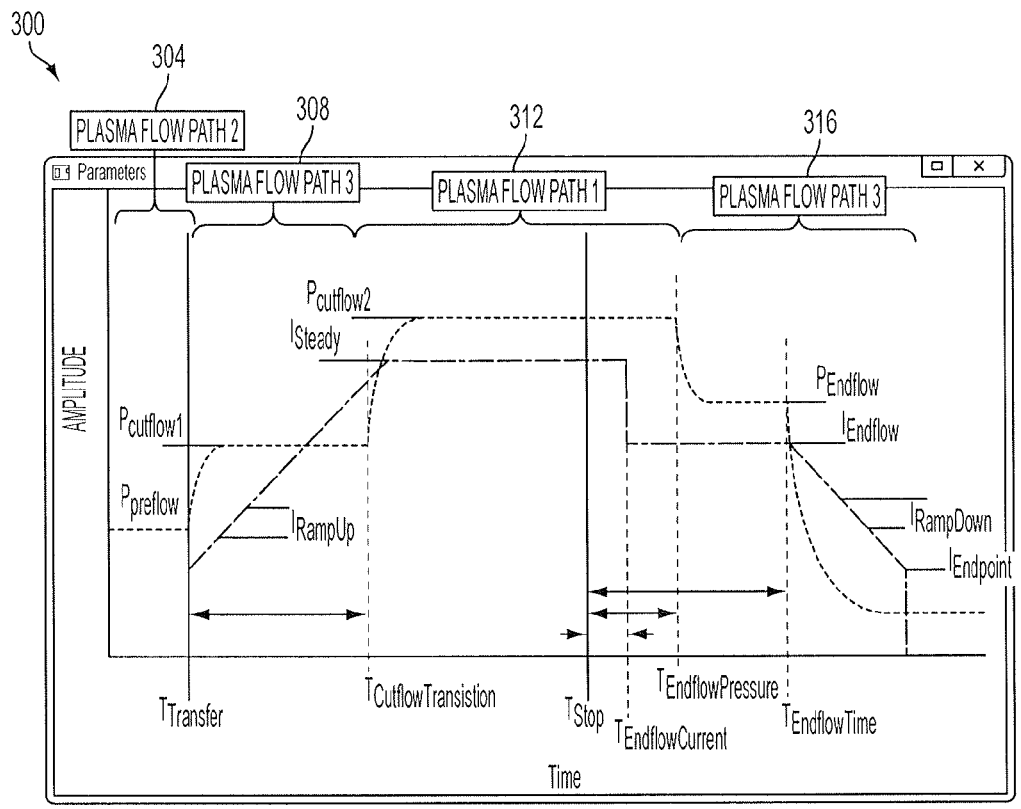
FIG. 3 shows an exemplary timing diagram for gas pressure and arc current of a plasma arc cutting system having an improved electrode life, according to an illustrative embodiment of the invention.

FIG. 3 shows an exemplary timing diagram 300 for gas pressure, gas composition, and arc current of a plasma arc cutting system having an improved electrode life, according to an illustrative embodiment of the invention. The timing diagram 300 shows four sequential time periods of significance: a preflow period 304 (corresponding to plasma flow path 2); an arc ignition period 308 (corresponding to plasma flow path 3); a cutting period 312 (corresponding to plasma flow path 1); and an arc extinction period 316 (corresponding to plasma flow path 3). During these time periods the system uses two input signals to coordinate the gas and current: an arc transfer signal, provided at time $T_{transfer}$; and an arc stop signal, provided at time $T_{stop}$. Other relevant times can be determined based on a time delay offset relative to the $T_{transfer}$ and/or the $T_{stop}$ signals. For example, the time $T_{Cutflow\ Transition}$ can be a fixed time interval from the time $T_{transfer}$. The times $T_{EndflowCurrent}$, $T_{EndflowPressure}$, and/or $T_{EndflowTime}$ can be a fixed time interval from the time $T_{stop}$.

In the control scheme shown in FIG. 3, a preflow pressure $P_{preflow}$ is provided via plasma flow path 2 (corresponding to the second distinct plasma gas flow pattern, e.g. flowing gas through a second path internal to the torch body) during the preflow period 304. In some embodiments, either nitrogen or air is used in conjunction with plasma flow path 2.

During the arc ignition period 308, the current and pressure can be increased. Three events can occur at or around time $T_{transfer}$: the pressure can be increased from $P_{preflow}$ to a first cut flow pressure $P_{cutflow1}$; the current can be increased from about zero to a nonzero value $I_{RampUp}$; and/or the plasma gas flow path can be switched to plasma flow path 3 (corresponding to a combination of plasma flow paths 1 and 2, e.g. flowing gas through first and second paths internal to the torch body). In some embodiments, either nitrogen, oxygen or air is used in conjunction with plasma flow path 3. The pressure can increase rapidly and taper off smoothly toward a constant value. The current can increase linearly up until a time around or just after time $T_{Cutflow\ Transition}$.

During the cutting period 312, a workpiece can be cut using the plasma arc torch. After time $T_{Cutflow\ Transition}$ the plasma flow path can be switched to plasma flow path 1 (corresponding to the first distinct plasma gas flow pattern), while the pressure can be increased to $P_{cutflow2}$ and the current can attain a steady value $I_{steady}$. In some embodiments, flow path 1 carries oxygen gas. Generally, when the arc is at full current and is cutting mild steel, oxygen can be used.

During the arc extinction period 316, the arc can be extinguished and a cutting operation ceased. A stop signal can be provided at time $T_{stop}$, which can trigger several events relevant to the ending of a cutting operation. The current can be rapidly (e.g. instantaneously or near instantaneously) decreased to a current $I_{endflow}$ at time $T_{EndflowCurrent}$. At or near time $T_{endflowPressure}$, the plasma flow path can be changed to plasma flow path 3 and/or the pressure can be decreased to $P_{Endflow}$, e.g. in a smoothed manner shown in FIG. 3. At time $T_{EndflowTime}$ the current can be decreased (e.g. linearly) to a current $I_{Endpoint}$, after which the current can be instantaneously or near instantaneously decreased to zero. Also at time $T_{EndflowTime}$, the pressure can smoothly taper off as shown in FIG. 3. During this time, a vent valve (e.g. the vent valve 152 as shown above in FIG. 1) can be active. The vent valve can impact the timing of the pressure decrease during this time. In some embodiments, when cutting with low plasma currents, the vent valve can remain closed.

Figure 4:
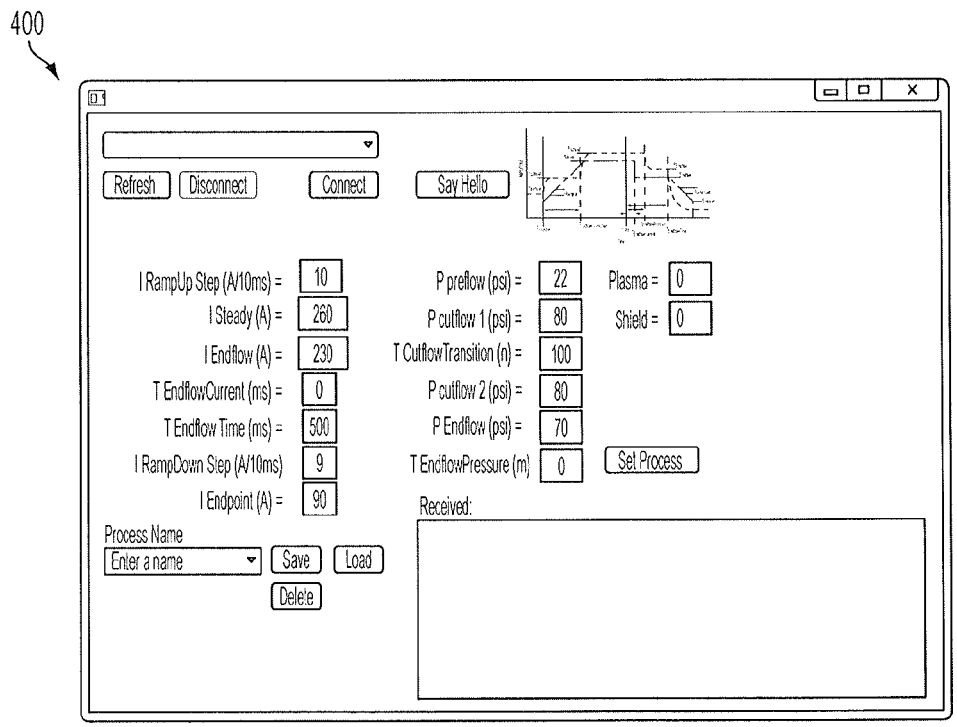
FIG. 4 is an illustration of a computerized control interface for a plasma arc cutting system having an improved electrode life, according to an illustrative embodiment of the invention.

FIG. 4 is an illustration of a computerized control interface 400 for a plasma arc cutting system having an improved electrode life, according to an illustrative embodiment of the invention. The interface 400 can include user input fields for key values described above. For example, FIG. 4 shows a screenshot of an interface 400 in which a user has set $I_{steady}$ to 260A and $I_{Endflow}$ to 230A using a ramp up step of 10 A/10 ms, a ramp down step of 9 A/10 ms. The user has set $T_{EndflowCurrent}$ to 0 MS; $T_{EndflowCurrent}$ to 0 MS; $T_{EndflowTime}$ to 500 ms; $T_{CutflowTransition}$ to 100 ms; and $T_{Endflowpressure}$ to 0 ms. The user has set $P_{preflow}$ to 22 psi; $P_{Cutflow1}$ to 80 psi; $P_{Cutflow2}$ to 80 psi; and $P_{Endflow}$ to 70 psi. The interface 400 shows exemplary magnitudes and time values used during development; these values are not necessarily optimized and reflect only a single set of possible values. The interface 400 can be part of a software platform that allows a user to customize at least the parameters shown in the interface 400. The interface 400 can be configured to provide instructions to a control unit (not shown) of the plasma arc cutting system to implement the user-set parameters.

Figure 5:
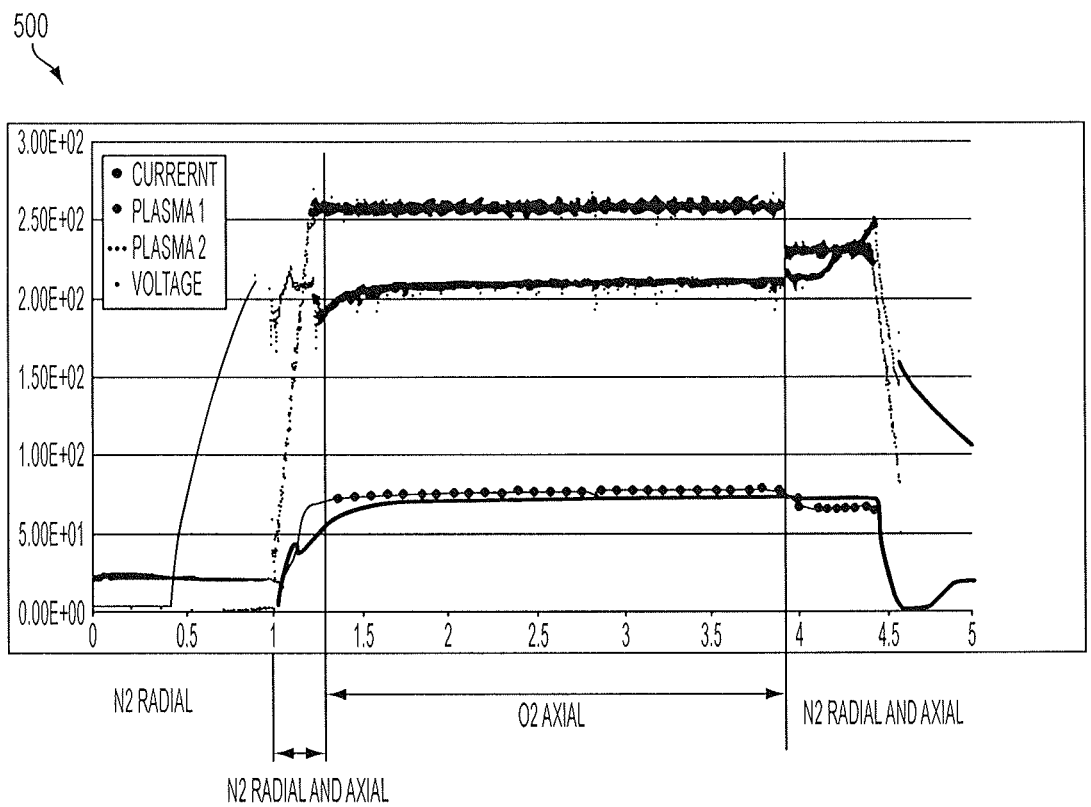
FIG. 5 shows a plot of time versus gas pressure and arc current for a plasma arc cutting system having an improved electrode life, according to an illustrative embodiment of the invention.

FIG. 5 shows a plot 500 of time versus gas pressure and arc current for a plasma arc cutting system having an improved electrode life, according to an illustrative embodiment of the invention. In FIG. 5, the plot 500 shows that the gas pressure is changed at a time at which arc transfer is detected; at a time offset from the transfer sense; and/or at a time at which the "arc on" signal is removed. In addition, the flow path can be changed at or near each of these times. The type of gas and/or flow pattern can also be changed at or near each of these times, as shown in FIG. 5 (e.g. from nitrogen gas flowing radially—path 2, to nitrogen gas flowing both radially and axially—path 3, to oxygen gas flowing axially—path 1, and/or to nitrogen gas flowing both radially and axially—path 3).

Figure 6:
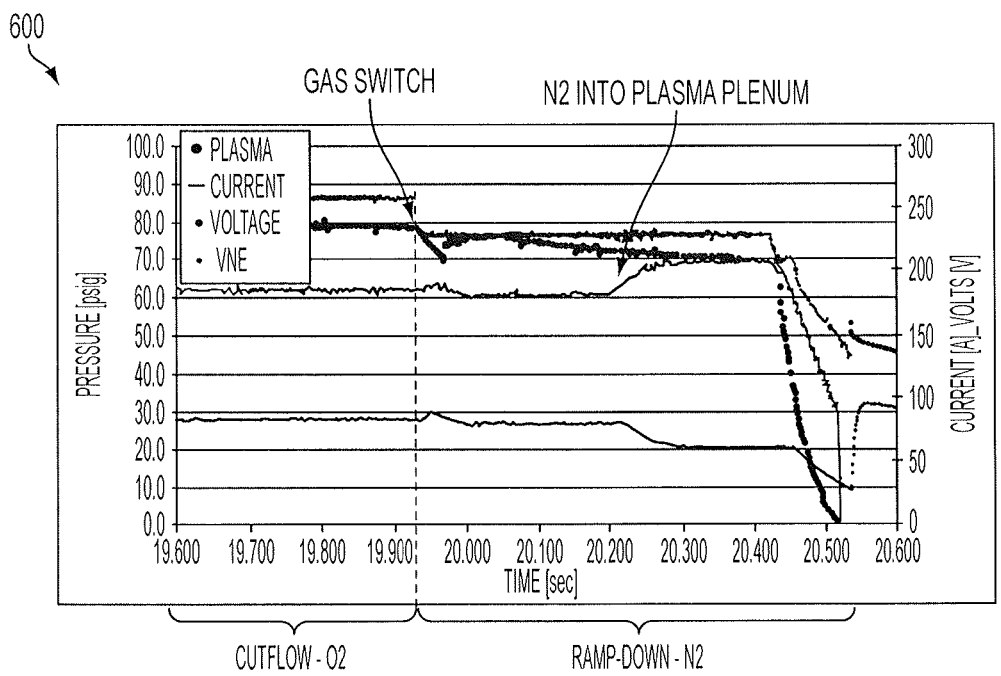
FIG. 6 shows a plot of time versus gas pressure, voltage and arc current for a plasma arc cutting system having an improved electrode life, according to an illustrative embodiment of the invention.

FIG. 6 shows a plot 600 of time versus gas pressure, voltage and arc current for a plasma arc cutting system having an improved electrode life, according to an illustrative embodiment of the invention. The change in gas chemistry can be confirmed by observing the arc voltages. The plot 600 shows the change in voltages that occurs when the gas chemistry in the region of the arc changes. This value is important for controlling the process timing. It is expected that the time of exposure to different gas types is critical to optimizing electrode life. When tests were performed with exposure times of less than ~100 ms, the electrode life decreased from when the exposure time was around 300 ms, as shown in FIG. 6. When the exposure time approached 1 second, electrode life decreased.

Figure 7:
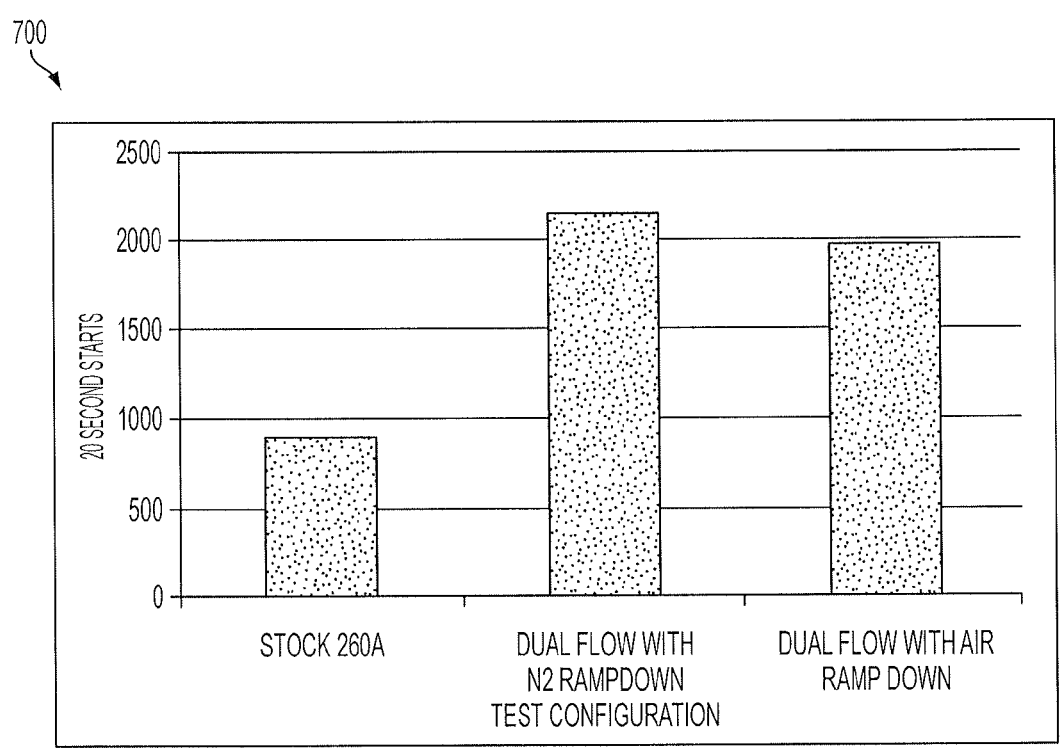
FIG. 7 is a chart showing test results of electrode life for electrode configurations according to an illustrative embodiment of the invention compared with a previous configuration.

FIG. 7 depicts a chart 700 showing test results of electrode life for electrode configurations according to an illustrative embodiment of the invention compared with a previous configuration. Tests were conducted based on an existing cutting process used in the HPR equipment line manufactured by Hypertherm, Inc. The existing process involved a 260A oxygen plasma, air shield process. This process uses a single gas flow pattern and swirl generation device. This process uses air for the preflow gas and changes to oxygen right at the arc transfer signal. In this process, there is no gas change or path change at arc extinction. As can be seen from the chart 700, methods and systems used in accordance with principles of the current invention can increase electrode life by about 100% over the standard process. The life for the high current process 260A is about the same as the 130A process. One of ordinary skill in the art would have expected that life improvement would be seen mostly at short cut cycle times. However, the life improvement was substantial at the medium cut cycle of 20 seconds. The large improvement in life at medium and long cycles constitutes unexpected results. Without being bound to a single explanatory theory, it is likely that the large improvement in life at medium and long cycles was caused by changes in the steady flow conditions through the change in gas velocity.

While the invention has been particularly shown and described with reference to specific preferred embodiments, it should be understood by those skilled in the art that various changes in from and detail may be made therein without departing from the spirit and scope of the invention as defined by the following claims.

What is claimed is:

1. A method of operating a plasma arc torch system, the method comprising:
   providing (i) a plasma arc torch having a plasma chamber in which a plasma arc is generated, (ii) a first plasma gas supply source and a second plasma gas supply source for providing a plasma gas flow to the plasma arc torch, and (iii) a control unit for controlling cutting parameters including plasma gas composition and plasma gas flow path;
   flowing a first plasma gas composition through a first plasma gas flow path during an arc ignition period;
   generating the plasma arc using the first plasma gas composition;
   changing the first plasma gas composition to a second plasma gas composition after the plasma arc is generated;
   changing the first plasma gas flow path to a second plasma gas flow path after the plasma arc is generated, the second plasma gas flow path different from the first plasma gas flow path; and
   sustaining the plasma arc using the second plasma gas composition during a cutting period;
   wherein the first and second plasma gas flow paths both are at least partially disposed within the plasma arc torch.

2. The method of claim 1 further comprising cutting a workpiece with the plasma arc torch after the changing of the first plasma gas composition to the second plasma gas composition and the first plasma gas flow path to the second plasma gas flow path.

3. The method of claim 1 further comprising adjusting, in response to receiving a stop signal, at least one of a supply current, a gas flow pressure, a gas composition, or a gas flow path.

4. The method of claim 1 further comprising detecting an arc transfer after the plasma arc is generated.

5. The method of claim 1 further comprising at least one of (i) changing the second plasma gas composition to a third plasma gas composition; or (ii) changing the second plasma gas flow path to a third plasma gas flow path.

6. The method of claim 5 wherein the third plasma gas flow path includes a portion of the first plasma gas flow path and a portion of the second plasma gas flow path.

7. The method of claim 5 wherein changing the second plasma gas composition or the second plasma gas flow path is performed in response to either (i) a removal of a start signal from the plasma torch system; or (ii) a time offset from a transfer sense.

8. The method of claim 5 wherein changing the second plasma gas composition or the second plasma gas flow path includes decreasing a gas pressure of the plasma gas.

9. The method of claim 5 further comprising adjusting a current value of the plasma arc.

10. The method of claim 1 wherein the first plasma gas flow path is configured to impart a substantially radial velocity component to the plasma gas.

11. The method of claim 1 wherein the second plasma gas flow path is configured to impart a substantially axial velocity component to the plasma gas.

12. The method of claim 1 wherein the first plasma gas composition includes at least one of oxygen, nitrogen, air, or argon.

13. The method of claim 1 wherein the second plasma gas composition includes an oxidizing gas or consists essentially of oxygen.

14. The method of claim 1 wherein changing the first plasma gas flow path to a second plasma gas flow path includes changing at least one of a plasma gas pressure or a plasma gas flow rate.

15. The method of claim 1 wherein the first plasma gas flow path and the second plasma gas flow path are configured to impart different and distinct velocity components or swirl patterns to the plasma gas flow through the plasma arc torch.

16. The method of claim 5 wherein the third plasma gas flow path is configured to impart a third swirl pattern to the plasma gas flow.

17. A method for operating a plasma torch system, the method comprising:

providing (i) a plasma torch having a nozzle and an electrode, the nozzle and the electrode defining a plasma chamber in which a plasma arc is generated, (ii) a plasma gas supply source for providing a plasma gas flow to the plasma torch, and (iii) a control unit for controlling cutting parameters including a plasma gas composition and a plasma gas flow path to the plasma torch;

generating the plasma arc;

establishing a first plasma gas composition and a first plasma gas flow path during an arc ignition period, the first plasma gas flow path configured to impart a first swirl pattern to the plasma gas flow;

changing the first plasma gas composition to a second plasma gas composition;

changing the first plasma gas flow path to a second plasma gas flow path, the second plasma gas flow path configured to impart a second swirl pattern to the plasma gas flow during a cutting period;

changing the second plasma gas composition to a third plasma gas composition; and changing the second plasma gas flow path to a third plasma gas flow path, the third plasma gas flow path configured to impart a third swirl pattern on the plasma gas flow.

18. The method of claim 17 wherein the first gas composition and the third gas composition are substantially similar.

19. The method of claim 17 wherein the third plasma gas flow path and the first plasma gas flow path are substantially similar.

20. The method of claim 17 wherein the first swirl pattern is distinct from at least one of the second swirl pattern or the third swirl pattern.

21. The method of claim 17 wherein changing the first plasma gas flow path includes changing a flow rate of plasma gas to the plasma arc torch.

22. The method of claim 17 wherein changing the second plasma gas flow path includes changing a flow rate of plasma gas to the plasma arc torch.

* * * * *